(12) United States Patent
Fanaras, Jr.

(10) Patent No.: US 10,673,217 B2
(45) Date of Patent: Jun. 2, 2020

(54) ELECTRICAL BOX MOUNTING TOOL

(71) Applicant: Charles A Fanaras, Jr., Kensington, NH (US)

(72) Inventor: Charles A Fanaras, Jr., Kensington, NH (US)

(*) Notice: Subject to any disclaimer, the term of this patent is extended or adjusted under 35 U.S.C. 154(b) by 154 days.

(21) Appl. No.: 16/110,932

(22) Filed: Aug. 23, 2018

(65) Prior Publication Data
US 2020/0067297 A1 Feb. 27, 2020

(51) Int. Cl.
*H02G 3/00* (2006.01)
*H02G 3/12* (2006.01)

(52) U.S. Cl.
CPC ................... *H02G 3/126* (2013.01)

(58) Field of Classification Search
CPC ........... H02G 3/28; H02G 3/386; H02G 5/025
See application file for complete search history.

(56) References Cited

U.S. PATENT DOCUMENTS

| | | | | |
|---|---|---|---|---|
| 5,361,509 A | * | 11/1994 | Wheeler, Sr. | B25H 7/00 269/904 |
| 5,758,430 A | * | 6/1998 | Holloway | H02B 1/26 33/528 |
| 2005/0152144 A1 | * | 7/2005 | Nash | F21V 17/02 362/286 |

* cited by examiner

*Primary Examiner* — Pete T Lee
(74) *Attorney, Agent, or Firm* — Robert S. Smith

(57) ABSTRACT

Apparatus for facilitating mounting of an electrical box on an associated stud of an associated building which includes an elongated support comprising 1st and 2nd telescoping elongated support members dimensioned and configured for sliding for relative sliding engagement whereby the overall length of the 1st and 2nd telescoping elongated members is adjustable, the elongated support having 1st and 2nd opposed sides. A support plate is carried on the elongated support, the support plate is pivotally attached to the elongated support with at least a portion thereof extending laterally with respect to the elongated support whereby pivotal motion of the support plate positions the portion from the 1st side to the 2nd sides of the elongated support. Engagement surfaces on the portion are dimensioned and configured for engaging an associated electrical box.

7 Claims, 2 Drawing Sheets

ELECTRICAL BOX MOUNTING TOOL

TECHNICAL FIELD

The present invention is generally directed to electrician's tools. More particularly, the present invention is directed to a tool for holding electrical boxes in position for mounting electrical boxes to upright studs at a proper height and depth.

BACKGROUND OF THE INVENTION

After a building's framing has been completed, electrical boxes that will subsequently accommodate the building's electrical outlets, switches, light fixtures and other wiring devices are attached to wood or metal studs. Electrical codes require that these boxes must be located at predetermined distances from the floor. The boxes must also be mounted in a manner that positions a virtual plane coincident with the open front face of the box in coplanar relationship with the exposed face of the wallboard that will subsequently secured to the studs.

Traditionally, the electrician relies on only the most basic tools for the task of installing electrical boxes on the framing components of a building. These basic tools consist of such things as a hammer and tape measure. Each time an electrical outlet or switch box is installed, two separate measurements must be made. First, the distance from the floor must either be independently measured then marked on the stud or established using a stick marked at the proper heights for the various boxes. Second, the distance by which the box must extend beyond the face of the stud is determined. To save time, this depth measurement may just be estimated, sometimes with the help of some depth markings along the outside face of the junction box, this practice often results in boxes that do not protrude far enough or, worse, protrude too far from the surface of the wall.

In addition, if a box is not held securely during the fastening step, it may be mounted at an angle to the surface of the stud. Any of these conditions result in difficulties during the finish stage of the project. A typical residential building can use hundreds of electrical boxes for outlets, switches, TV cable, telephone, intercoms, etc. Typical commercial structures require even greater quantities of electrical boxes.

After installing several dozen boxes, especially those which are mounted near to the floor level, the worker can experience fatigue and back pain. If the worker is not highly skilled, or if he or she is compelled to work too quickly, the boxes may be poorly aligned to the framing, and mounting heights from the floor may not be consistent. This frequently results in later difficulties and quality problems when the installation of receptacles and switches is completed. Many electricians have experienced the repetitive tedious steps required and will thus appreciate a tool that helps in installing electrical boxes at the proper height, depth, and alignment without the need for repeated measuring, bending or kneeling.

The prior art includes various devices that attempt to simplify the installation of electrical boxes. Many of them make it difficult to adjust the apparatus in a manner that accommodates the idiosyncrasies of the required installation. For example, the mounting of the box is on the left side or the right side of the relevant stud; the shape of the box may be rectangular and mounted with a major axis that is horizontal or vertical; a plurality of boxes may be ganged together, etc. the accommodation of the apparatus for the variables commonly encountered.

From the above, it is therefore seen that there exists a need in the art to overcome the deficiencies and limitations described herein and above.

SUMMARY OF THE INVENTION

The shortcomings of the prior art are overcome and additional advantages are provided through apparatus for facilitating mounting of an electrical box on an associated stud of an associated building which includes an elongated support comprising 1st and 2nd telescoping elongated support members dimensioned and configured for sliding for relative sliding engagement whereby the overall length of the 1st and 2nd telescoping elongated members is adjustable, the elongated support having 1st and 2nd opposed sides. A support plate is carried on the elongated support, the support plate is pivotally attached to the elongated support with at least a portion thereof extending laterally with respect to the elongated support whereby pivotal motion of the support plate positions the portion from the 1st side to the 2nd sides of the elongated support. Engagement surfaces on the portion are dimensioned and configured for engaging an associated electrical box. The support plate carries at least one spacer dimensioned and configured for positioning a virtual plane coincident with the open front face of an associated electrical box, when the electric box is engaged with the engagement surfaces, that is coincident with the exposed face of a wallboard proximate to the installed electrical box.

In some embodiments the apparatus includes a detent mechanism for selectively securing the portion of the support plate at a position selected from a position at the 1st side and a position at the 2nd side of the elongated support. Some embodiments further including a detent apparatus for selectively securing the relative axial positions of the 1st and 2nd telescopic elongated members whereby relative axial motion therebetween is prevented.

In some forms of the invention the apparatus includes a rubber foot at one axial extremity of the elongated support. A handle may extend laterally from one side of one axial extremity of elongated support. The support plate may be carried by an axial extremity of the elongated support proximate to the handle.

Lastly, but not limited hereto, it is an even further object of the present invention to greatly facilitate the installation of electrical boxes.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
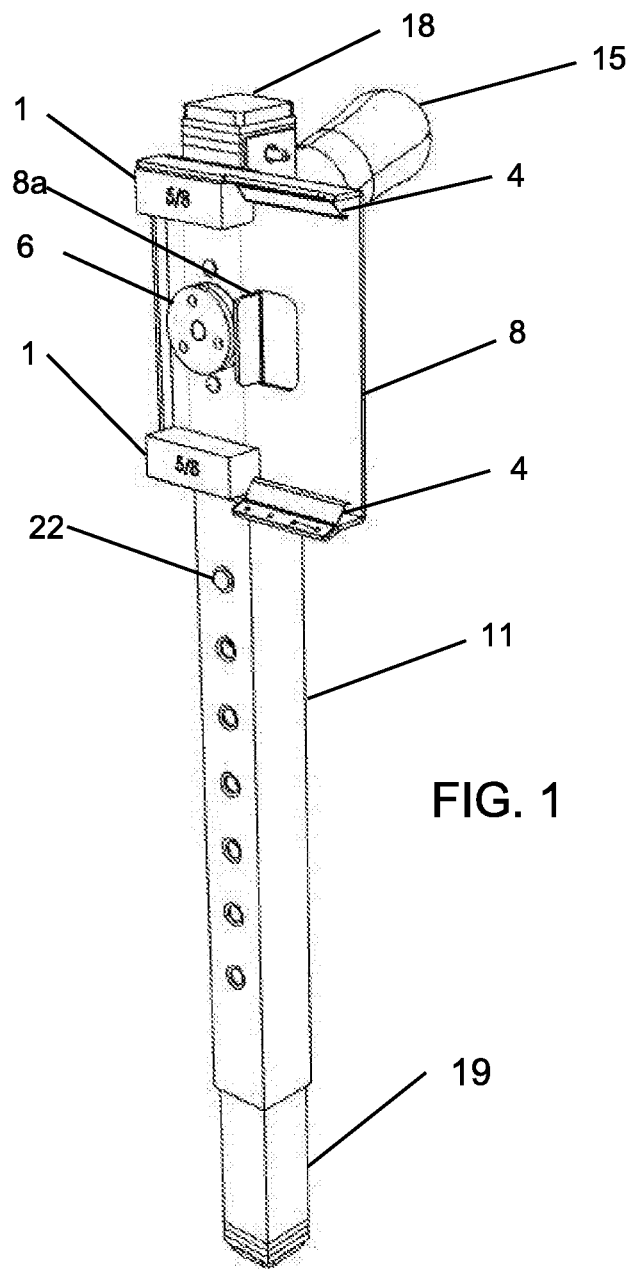
FIG. 1 is a perspective view of one embodiment of the assembled apparatus in accordance with one form of the present invention.
Figure 2:
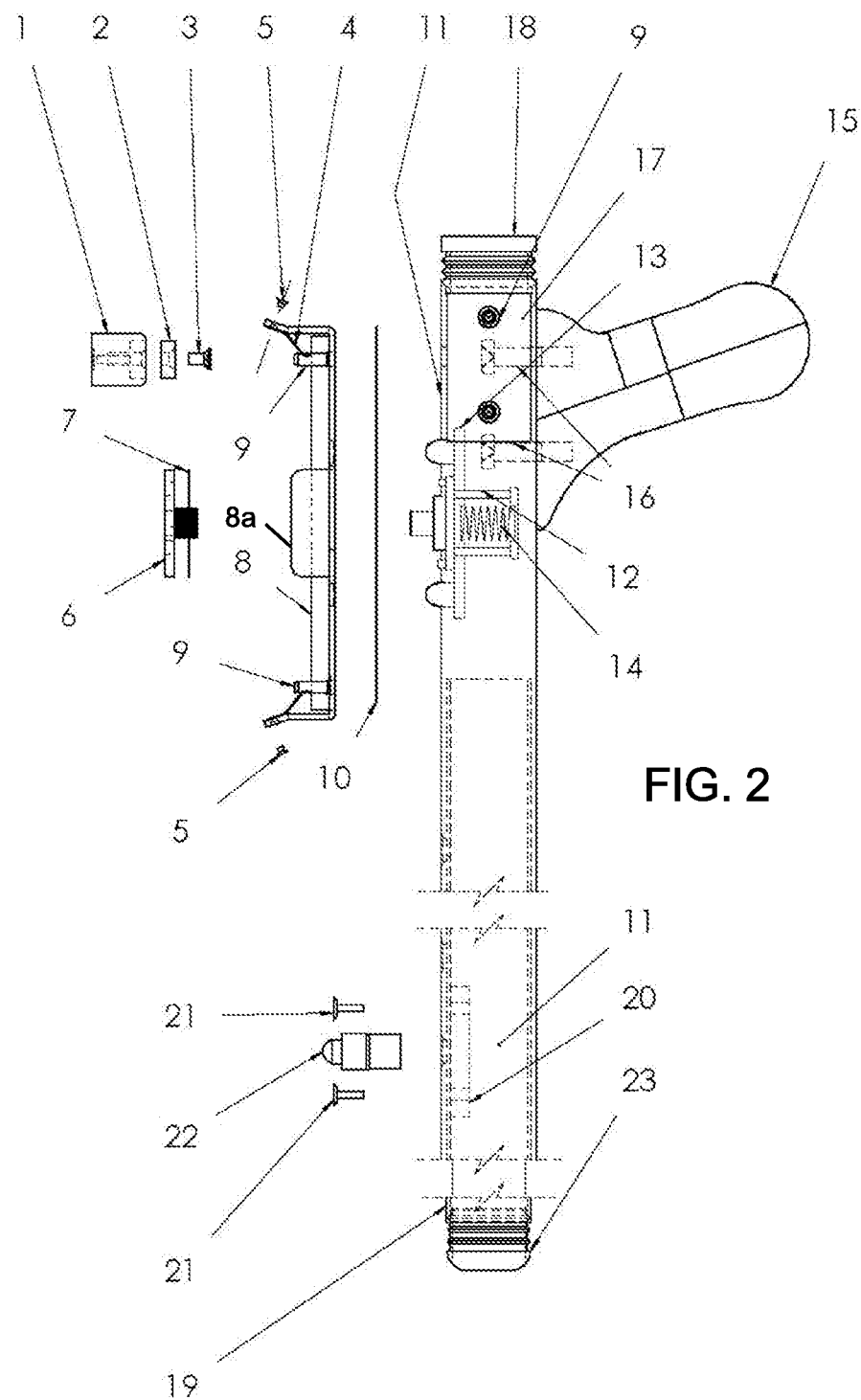
FIG. 2 is an exploded side view of the apparatus illustrated in FIG. 1.

Referring now to the drawings there is shown a height indexing outer sleeve 11 disposed in telescoping engagement with a height setting inner sleeve 19. In the illustrated embodiment, the sleeves of the 11, 19 are square cross-section tubing. Other embodiments may use circular tubing. As described above, those skilled in the art will recognize that a 180 degree rotation of the rotating box holder 8 similarly facilitates mounting of the box on either the left or right side of a stud. If the user wishes to install the box on the left side of the stud the position shown in FIG. 1 is the appropriate position. If the user wishes to install the box on the right side of the stud the second position thereof in which the rotating box holder 8 is rotated 180 degrees from the first (FIG. 1) position is the appropriate position.

The relative axial position of the sleeves 11 with respect to the sleeve 19 is releasably secured by a spring biased releasing plunger or ball detent assembly 22 secured to the inner sleeve 19 by pop rivets 21. Those skilled in the art will recognize that depression of the ball in the ball detent assembly 22 the detent from a registered aperture in the outer sleeve 11 to permit adjustment of the relative axial positions of the respective sleeves 19, 11. The lower extremity of the inner sleeve 19 is provided with a rubber foot 23 for support and stability. An end cap 18 closes the upper axial extremity of the outer sleeve 11. A handle 15 secured by screws 16 to the outer sleeve 11. Ordinarily, the handle 15 is secured to the upper axial extremity of the assembly to minimize the need for the operator to bend as part of an installation process.

Disposed on the side of the outer sleeve 11 close to the handle 15 is a rotating box holder 8. More particularly, the rotating box holder 8 is rotatable from the position shown in FIG. 1 about an axis (not show) that is coincident with the geometric axis of the tension nut 6. The user's position of choice depends on the side of the stud on which the box is to be installed.

More particularly, those skilled in the art will recognize that a 180 degrees rotation of the rotating box holder 8 similarly facilitates mounting of the box on either the left side or right side of a stud. The locking detent assembly 13 facilitates rapid adjustment between the two locked positions and provides stable locking in each of the two alternative positions. The two alternative positions of the rotating box holder 8 are (1) a first position as shown in FIG. 1 and (2) a second position in which the rotating box holder 8 is rotated 180 degrees from the first position.

The rear face of the rotating box holder 8 is covered with an anti-friction covering such as ultra-high-molecular-weight polyethylene to facilitate rotation of the rotating box holder 8 and utilization. More specifically, the angular position of the rotating box holder 8 is releasably fixed in a plurality of angular positions by a locking detent assembly 13 that includes a locking assembly cylinder 12 and a locking pressure spring 14.

The associated electrical box (not shown) is secured to the rotating box holder 8 by two box holder leaf springs 4 which are each secured by a holder spring rivet 5. An additional a locking assembly tension nut 6 that cooperates with a tension nut anti-friction washer 7 to facilitate rotational movement of the rotating box holder 8 incident to normal operation thereof.

The apparatus in accordance with the present invention uniquely accommodates wallboard having any standard thickness, including, but not limited to wallboard that is ½", ⅝", ¾"; 1", or 1¼" thick. Other thicknesses are possible; however, these particular thicknesses correspond to the commonly available wallboard thicknesses. More specifically, two identical appropriately sized respective depth setting spacers 1 are seated in respective holders 8. More specifically each of the spacers 1 includes an iron portion. A depth setting magnet 2 is secured by depth setting spacer magnet screws to the rotating box holder 8. Accordingly, each appropriate spacer for use with the wallboard being used will snap in to the corresponding recess within the rotating box holder 8. Thus, in operation a user will initially choose the appropriate spacers 1 corresponding to the thickness of the wallboard that will be installed after installation of the box in the building being constructed. The utilization of the appropriate spacers 1 results the open face of the box being disposed in flush relationship to the outer face of the wallboard.

After selection of the appropriate spacers 1, the user must determine whether the box is to be installed on the left or right side of a stud. If the user wishes to install the box on the left side of the stud, the position shown in FIG. 1 is the appropriate position. If the user wishes to install the box on the right side of the stud, the second position thereof in which the rotating box holder 8 is rotated 180 degrees from the first (FIG. 1) position is the appropriate position.

Thereafter, the user pushes a conventional open face rectangular electric box (not shown) face first into engagement with both box holder leaf springs 4 with the face of the box abutting the rotating box holder 8 and the side of the open face rectangular electric box abutting a stop 8a carried on the rotating box holder 8. The user then positions the apparatus with the sleeves 11, 19 vertically oriented with the rubber foot 23 adjacent to the front of a stud on which the box is to be installed and the two depth setting spacers 1 abutting the outer face of the stud. (The spacers typically are ½", ⅝", ¾"; 1", or 1¼" inches thick corresponding to the thickness of the wallboard to be installed at a later time.) Accordingly, given the rotating box holder 8 position shown in FIG. 1, the electric box is precisely positioned so that the user can easily secure the box to the left side of the stud. Often the box is secured by nails.

In one embodiment of the present invention the rotating box holder 8 is manufactured of heat treated carbon steel. The box holder leaf springs 4 are manufactured of heat treated and tempered spring steel. The box holding apparatus is capable of securing boxes manufactured by a wide variety of manufacturers. A rust resistance color coding finish is used throughout the apparatus.

Although the illustrated embodiment has sleeves 11, 19 that are square cross section tubing, other embodiments may use circular tubing. The illustrated embodiment illustrates an upper sleeve 11 that is physically larger than the lower inner sleeve 19. Those skilled in the art will recognize that other embodiments of the present invention may reverse this relationship. In some embodiments the sleeves 11, 19 are manufactured of precision 6061-T6 aluminum alloy tubing. The apparatus is manufactured with dimensions and tolerances for accuracy of use. The utilization of the tool does not require any other tool and does not require assembly, or disassembly. Because indicia are provided on the inner sleeve 19 indicative of the height of the box being installed above the floor no other measuring apparatus is required. The user is able to use the apparatus in accordance with the present invention to rapidly and accurately set the height and depth of a single box or multiple gang boxes (because the rotating box holder 8 has clearance to accommodate multiple gang boxes) at heights, for example, of 12" to 18" as well as 42" to 48" and depths from ½ inch to 1¼ inches.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

The following is a listing of the item number shown in the drawing:
depth setting spacer 1
depth setting spacer magnet 2
depth setting spacer magnet screws 3
box holder leaf spring 4
box holder leaf spring rivet 5
locking assembly tension nut 6
tension nut anti-friction washer 7
rotating box holder 8
stop 8*a*
depth spacer alignment pins 9
anti-friction material 10
height indexing outer sleeve 11
locking assembly cylinder 12
locking detent assembly 13
locking tab pressure spring 14
handle 15
handle attaching screws 16
depth spacer storage holder plate 17
end cap 18
height setting inner sleeve 19
plunger reinforcement plate 20
reinforcement plate pop rivet 21
ball detent assembly 22
rubber foot 23

What is claimed is:

1. An apparatus for facilitating mounting of an electrical box on an associated stud of an associated building which comprises: an elongated support comprising first and second telescoping elongated support members dimensioned and configured for sliding for relative sliding engagement whereby the overall length of the first and second telescoping elongated members is adjustable, said elongated support having first and second opposed sides; a support plate carried on said elongated support, said support plate being pivotally attached to said elongated support with at least a portion thereof extending laterally with respect to said elongated support whereby pivotal motion of said support plate positions said portion from said first side to said second sides of said elongated support; engagement surfaces on said portion dimensioned and configured for engaging an associated electrical box, said support plate carrying at least one spacer dimensioned and configured for positioning a virtual plane coincident with the open front face of an associated electrical box, when the electric box is engaged with the engagement surfaces, that is coincident with the exposed face of a wallboard proximate to the installed electrical box.

2. The apparatus as described in cam 1 further including a detent mechanism for selectively securing said portion of said support plate at a position selected from a position at said first side and a position at said second side of said elongated support.

3. The apparatus as described in claim 1 further including a detent apparatus for selectively securing the relative axial positions of said first and second telescopic elongated members whereby relative axial motion therebetween is prevented.

4. The apparatus as described in claim 1 further including a rubber foot at one axial extremity of said elongated support.

5. The apparatus as described in claim 1 further including a handle extending laterally from one side of one axial extremity of said elongated support.

6. The apparatus as described in claim 5 wherein said support plate is carried by an axial extremity of said elongated support proximate to said handle.

7. The apparatus as described in claim 1 wherein said engagement surfaces include a clearance to accommodate multiple gang boxes.

\* \* \* \* \*